United States Patent [19]
Houck

[11] Patent Number: 5,715,893
[45] Date of Patent: Feb. 10, 1998

[54] IMPLEMENT CONVERTIBLE BETWEEN A USE POSITION AND A TRANSPORT POSITION

[76] Inventor: Shane A. Houck, Rte. 1, Box 182, Pennville, Ind. 47369

[21] Appl. No.: 596,545

[22] Filed: Feb. 5, 1996

Related U.S. Application Data

[63] Continuation-in-part of Ser. No. 387,600, Feb. 13, 1995, Pat. No. 5,579,849.

[51] Int. Cl.⁶ ............... A01B 49/00; A01B 63/32
[52] U.S. Cl. ............... 172/311; 172/456; 280/411 A
[58] Field of Search ............... 172/310, 311, 172/452, 456, 254, 574, 458, 463, 457; 111/57; 280/411 A, 412, 413

[56] References Cited

U.S. PATENT DOCUMENTS

| | | | |
|---|---|---|---|
| 3,064,996 | 11/1962 | Roppel. | |
| 3,162,459 | 12/1964 | Marmorine et al.. | |
| 3,356,301 | 12/1967 | Barber et al.. | |
| 3,437,353 | 4/1969 | Lange. | |
| 3,738,682 | 6/1973 | Ritter. | |
| 4,113,273 | 9/1978 | Gates. | |
| 4,137,852 | 2/1979 | Pratt. | |
| 4,213,628 | 7/1980 | Hardesty. | |
| 4,319,643 | 3/1982 | Carter et al.. | |
| 4,361,341 | 11/1982 | Gustafson. | |
| 4,364,581 | 12/1982 | Shoup | 172/311 X |
| 4,381,118 | 4/1983 | Weeks. | |
| 4,445,706 | 5/1984 | Jarosek. | |
| 4,506,904 | 3/1985 | Kinzenbaw. | |
| 4,518,046 | 5/1985 | Rettig et al.. | |
| 4,552,375 | 11/1985 | Kinzenbaw. | |
| 4,577,881 | 3/1986 | Gerber. | |
| 4,601,484 | 7/1986 | Baker et al.. | |
| 4,721,168 | 1/1988 | Kinzenbaw. | |
| 4,878,545 | 11/1989 | Dyken. | |
| 4,881,603 | 11/1989 | Hartman. | |
| 4,923,017 | 5/1990 | Meek et al.. | |
| 5,113,956 | 5/1992 | Friesen et al. | 172/311 |
| 5,178,328 | 1/1993 | Broyhill. | |
| 5,191,942 | 3/1993 | Bussiere | 172/311 X |
| 5,265,898 | 11/1993 | Houck. | |
| 5,303,779 | 4/1994 | Friggstad. | |
| 5,346,019 | 9/1994 | Kinzenbaw et al.. | |

*Primary Examiner*—Terry Lee Melius
*Assistant Examiner*—Robert Pezzuto
*Attorney, Agent, or Firm*—Palmatier, Sjoquist, Helget & Voigt, P.A.

[57] ABSTRACT

A hitchable and towable implement suitable for the attachment of various agricultural tooling and that is convertible between a laterally expanded use position and a laterally narrow transport position. The implement has a wheeled lower center section connectable to a towing tractor by an elongate tongue member. An upper center frame section rotates on the lower center section. Powered and hinged lift arms extend in opposite directions from the upper center section and attach to a pair of wing sections for raising and lowering the wing sections. The wing sections rotate with the lift arms and the upper center section about the lower center section. Rotation of the upper center section one quarter turn swings the wing sections between a lateral position with respect to the lower center frame section and the transport position in which the wing sections are fore and aft of the lower center section. In the use position, lift arms and wing sections are laterally positioned and lowered to transfer weight from the center section to wheels on the wing sections. The lower center section and wing sections each have attachment bars extending horizontally for the attachment of desired tooling. Hydraulic cylinders can provide the power for the lifting of the wing sections and the rotation of the upper center portion. The raising, lowering and swinging can all be remotely controlled from a tow vehicle.

22 Claims, 8 Drawing Sheets

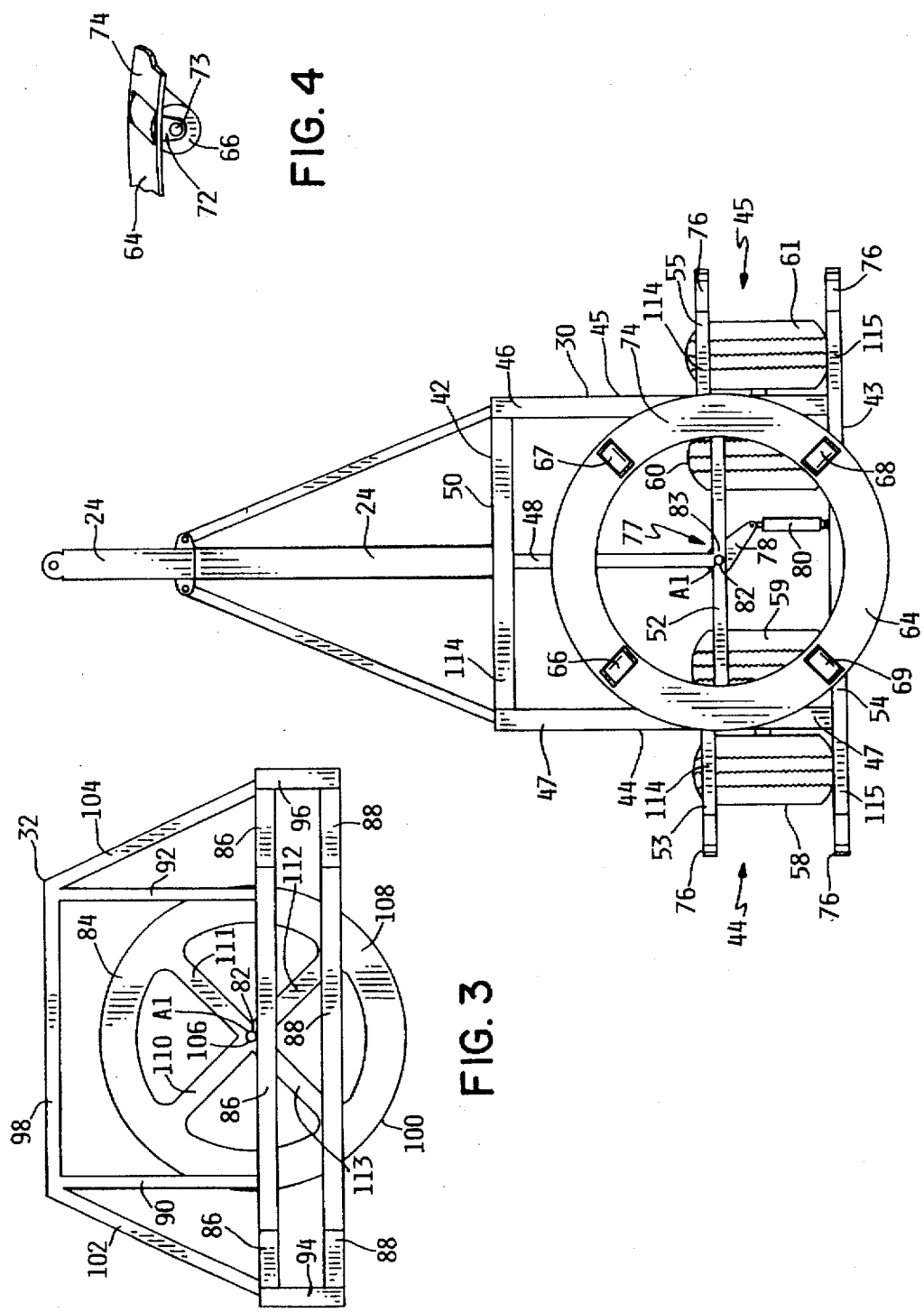

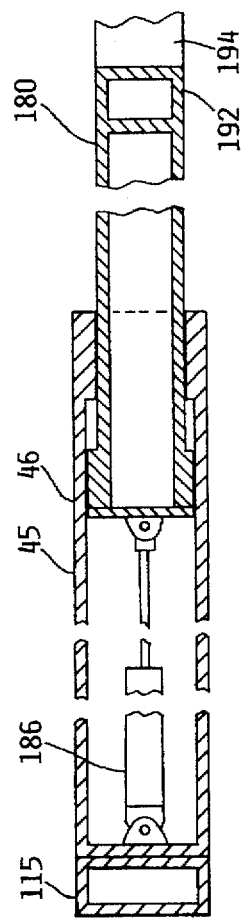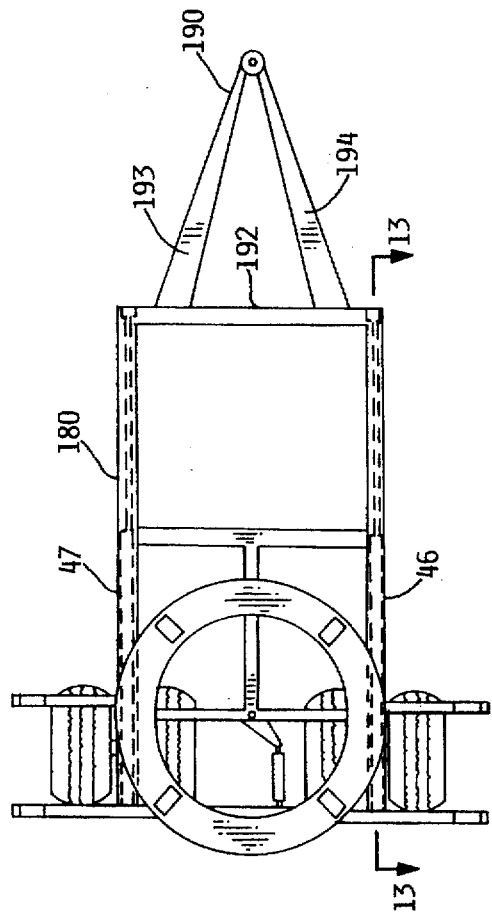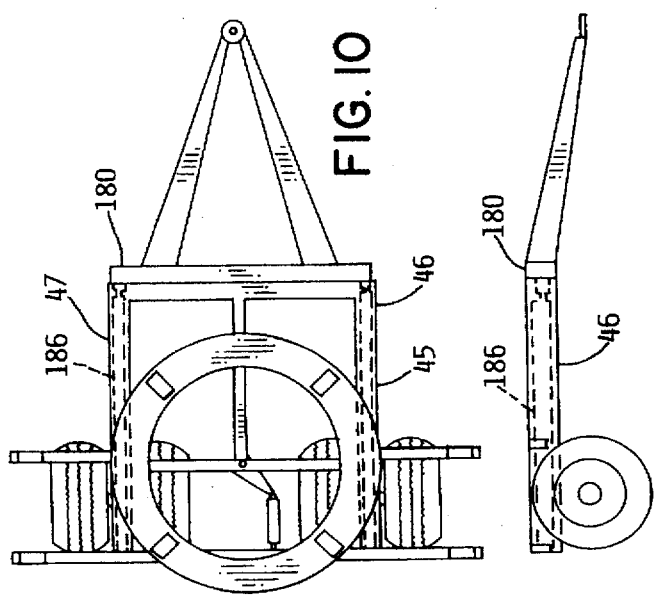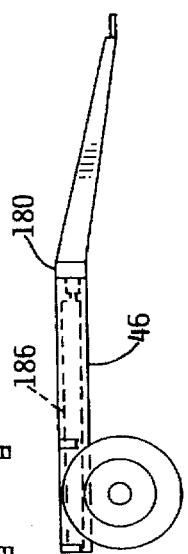

IMPLEMENT CONVERTIBLE BETWEEN A USE POSITION AND A TRANSPORT POSITION

BACKGROUND OF THE INVENTION

This is a continuation-in-part application of application for Ser. No. 08/387,600 filed Feb. 13, 1995, now U.S. Pat. No. 5,579,849. This invention relates to a towable implement suitable for agricultural use. More specifically, it relates to a towable implement convertible from the use position to a transport position.

It is desirable to have agricultural implements used for seeding, fertilizing, tilling, or the like to extend as far laterally as possible for covering the maximum amount of acreage in the minimal amount of time. With modern high-powered tractors the use of such wide implements provides for very efficient seeding, fertilizing, tilling, etc. However, these configurations can present significant problems in transporting the implements to and from use. Additionally, these wide units present problems in turning during field use. Various attempts have been made to overcome such problems. Typically the implement will be divided up into various gangs or individual sections which will be disconnected before transporting. Some such implements require separate trailers for transporting or have complicated unwieldy systems for reconfiguring the lateral extending implement into a more narrow towable device.

SUMMARY OF THE INVENTION

Disclosed is a hitchable and towable implement suitable for the attachment of various agricultural tooling and that is convertible between a laterally expanded use position and a laterally narrow transport position. The implement has a wheeled lower center section connectable to a towing tractor by an elongate tongue member. An upper center frame section rides and rotates on rollers on the lower center section. Powered and hinged lift arms extend in opposite directions from the upper center section and attach to a pair of wing sections for raising and lowering the wing sections. Downward force by the powered lift arms on the wing sections also aid in transferring weight from the center section to the wing sections. The wing sections rotate with the lift arms and the upper center section about the lower center section. Rotation of the upper center section one quarter turn swings the wing sections between a lateral position with respect to the lower center frame section and the transport position in which the wing sections are raised and positioned fore and aft of the lower center section. In the use position, lift arms and wing sections are laterally positioned and lowered. The wing sections each have wheels that contact the ground when the wing sections are lowered in the use position. In the lowered use position cooperating coupling members engage the proximal ends of the wing sections to provide additional stability. The lower center section and wing sections each have attachment bars extending horizontally for the attachment of desired tooling. Hydraulic cylinders can provide the power means for the lifting and lowering of the wing sections and the rotation of the upper center portion. The raising, lowering and swinging can all be remotely controlled from a tow vehicle.

An advantage and feature of the invention is that only the lateral wing sections are raised in converting from the use position to the transport position. The upper center section rotates but is not lifted. In applications such as fertilizing or seeding operations a sizable tank or hopper of significant weight is carried on the implement. Said containers are suitably positioned on the upper center section whereby the container is rotated as the wing sections are rotated but the container is not raised and lowered with the wing sections. This configuration provides significant advantage in that the design eliminates the need for stronger, more bulky, and heavier lifting arms and linkages and more power for accomplishing said lifting.

Another advantage and feature of the invention is that the hydraulic cylinders which raise and lower the lifting arms and wing sections also operate to provide downward force on the wing sections to unweight the center section. This allows for more even weight distribution across the entire width of the implement and allows better operation on varied terrain.

Another advantage and feature of the invention is that the lower center section has forward horizontal attachment bars and rearward horizontal attachment bars for attachment of desired tooling. The lower center section does not rotate and does not raise and lower. This configuration eliminates the need for complicated lifting and rotating mechanisms which would typically be required when all of the attachment bars require repositioning during the conversion from the use position to the transport position.

Moreover, the invention provides forward attachment bars and rearward attachment bars with adjacent regions that are substantially clear of any impediments, particularly impediments such as wheels. This allows convenient attachment of tooling across the entire width of the implement both at the forward attachment bars and the rearward attachment bars at any desired spacing. The open regions also allow for versatility in mounting a variety of different attachments at desired spacings. Moreover, the front and rear attachment bar configuration allows attachment of a different tooling in the front as compared to the rear. For example, a tillage or fertilizer attachment may be secured to the front attachment bars and seeding units on the rearward attachment bar or vice versa.

Another advantage and feature of the invention is the axial alignment of the lower center section wheels and the wing section wheels when in the use position. This configuration permits relatively easy turning during use and good contour following characteristics.

An additional feature and advantage of the invention is the use of two wing sections extending in opposing directions from a rotatable section of the central frame structure which provides a balanced configuration that is relatively easily rotated. Moreover, the use of the turntable on the upper center section and the turntable base on the lower center section also further facilitates the easy rotation of the upper center section.

BRIEF DESCRIPTION OF THE DRAWINGS

FIG. 2 is a detail plan view of the lower center section of the central frame structure.

FIG. 3 is a detail plan view of the upper center section of the central frame structure.

FIG. 4 is a detail perspective view showing one of the support rollers.

FIG. 10 is a top plan view of the lower center section of the central frame structure with the turntable base in place and the extensible frame portion in a retracted position.

FIG. 11 is a site elevational view of the lower center section and the extensible frame portion in a retracted position.

FIG. 12 is a top plan view of the structure shown in FIG. 10 with the extensible frame portion in an extended position.

FIG. 13 is a cross-sectional detail drawing of the longitudinal member with the extensible frame portion. This cross-section is taken at line 13—13 of FIG. 12.

Referring to FIGS. 14, 15, 16, 17 and 18, alternate configurations of a stabilizing linkage is shown. This embodiment utilizes ground-engaging wheels 125, 126 positioned at the distal portion 162 of the wing section 40 and additional ground-engaging wheels 196, 197 positioned at the proximal end portion 160 of said wing section 40. This particular configuration allows the wing section to follow a wide variety of contours. Additionally, there is more ground-engagement points provided by the proximal wheels 196, 197 and the distal wheels 125, 126 for better unweighting of the central frame portion 22.

Figure 16:
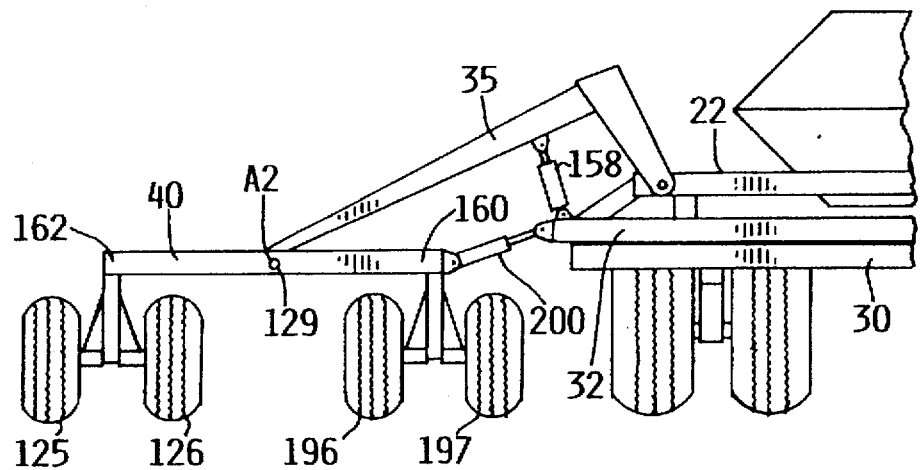
FIG. 16 is a rear elevational view of one embodiment of the device utilizing multiple wheels on the wing section and a wing stabilizer with the telescoping members.
Figure 18:
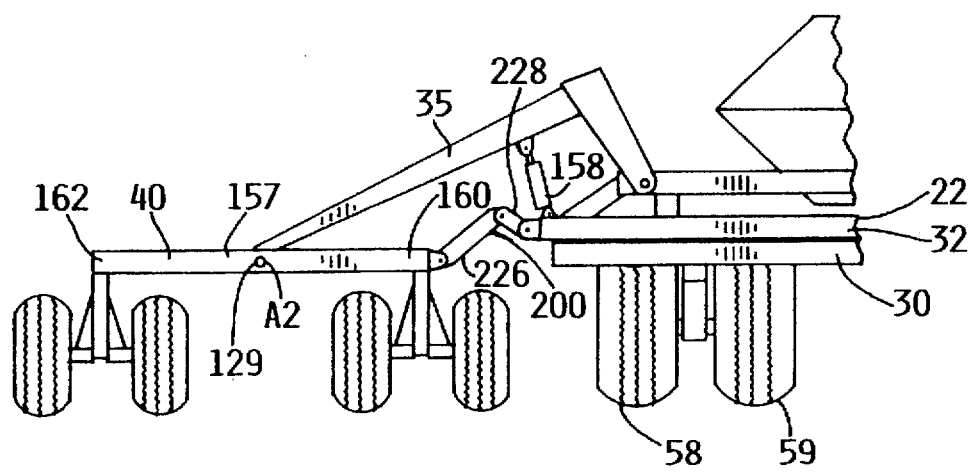
FIG. 18 is a rear elevational view of the implement with multiple wheels on the wing section and with the stabilizing linkage comprised of a pivotally connected foldable members, converging members 193, 194.

The wing section in this configuration is best shown in FIGS. 16 and 18, which pivots at a horizontal axis A-2 at the hinge or connection point 129. Thus, the distal wheels 125, 126 can independently follow contours separately from the proximal wheels 196, 197.

Figure 14:
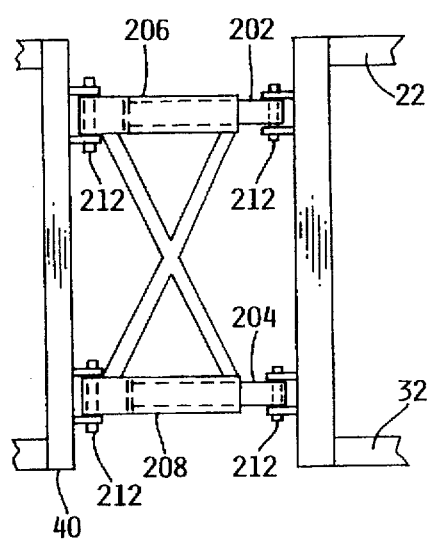
FIG. 14 is a detail elevational view of stabilizing linkage with telescoping in a retracted position.
Figure 15:
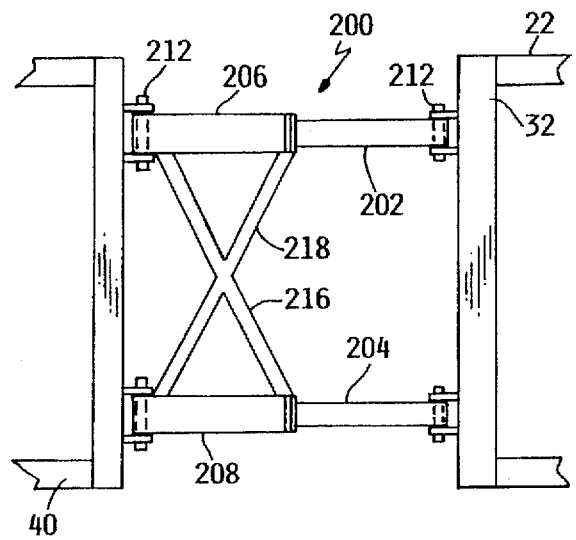
FIG. 15 is a same view as FIG. 14 with the stabilizing linkage in an extended position.

Referring to FIGS. 14 and 15, the stabilizing linkage 200 is shown in detail in a retracted position and an extended position. This configuration of the stabilizing linkage 200 utilizes telescoping members 202, 204 which track inside of exterior telescoping members 206, 208. The telescoping members all are pivotally attached to either the wing section 40 or the upper frame section 32 at hinges 212. Cross-members 216, 218 are provided for additional stability.

Figure 17:
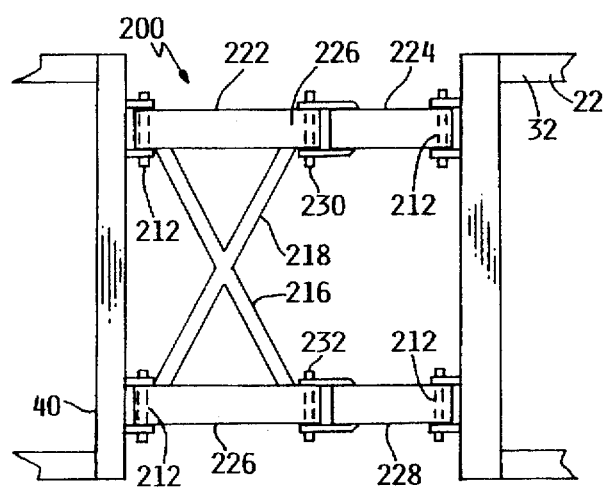
FIG. 17 is a detail plan view of a stabilizing linkage pivotally connected foldable members.

FIG. 17 and FIG. 18 show an alternative embodiment utilizing pivotally connected foldable members 222, 224, 226, 228. The foldable members are pivotally connected at hinges 230 and 232.

DETAILED DESCRIPTION OF THE PREFERRED EMBODIMENTS

Figure 1:
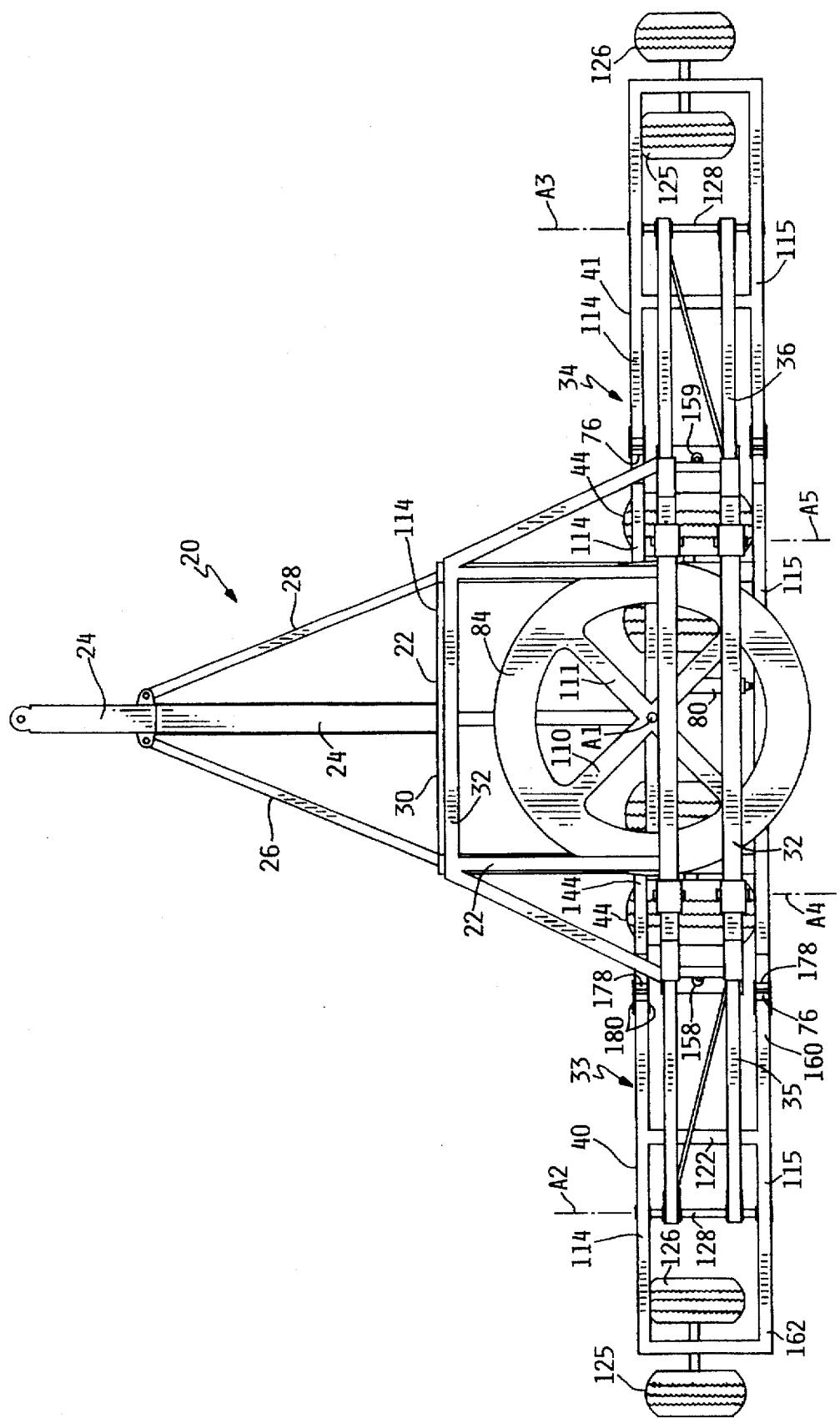
FIG. 1 is a top plan view of the convertible implement in the use position.

Referring to FIG. 1, a plan view of the farm implement is shown and is generally designated by the numeral 20. The implement is principally comprised of the central frame structure 22 which has a tow vehicle hitching portion or tongue member 24 extending forwardly for hitching to the tractor or other tow vehicle. Braces 26, 28 provide additional strength and rigidity to the tongue member. The central frame structure is comprised of a lower center section 30 and a rotatable section shown as an upper center section 32 which is positioned on the lower center section 30. FIGS. 2 and 3 are plan view details of the lower center section 30 and upper center section 32. Extending from the central frame structure 22, specifically the upper center section 32, are a pair of wing assemblies 33, 34 comprised of oppositely directed lifting linkages or lifting arms 35, 36 and wing sections 40, 41. The lifting linkages 35, 36 are hinged to the upper center section 32, are pivotally connected to wing sections 40, 41, and are powered to be raised and lowered.

Referring to FIGS. 2, 3, and 4, the major components of the central frame structure 22 are shown. The lower center section 30 and the central frame structure 22 in general have a front 42, a rear or back 43, and two sides 44, 45. The structural framework of the lower center section 30 has longitudinal frame members 46, 47 and an intermediate longitudinal member 48. Longitudinal member 46, 47, 48 are joined with transverse horizontal frame members 50, 52, 53, 54, 55. The frame members may be of conventional square steel tubing and be joined such as by welding. Ground wheels 58, 59, 60, 61 are suitably attached to the lower center section 30, for example on the longitudinal members 46, 47, by leaf springs. Mounted on the frame members 46, 47, 52, 54 is a turntable base 64 which has four inset support rollers 66, 67, 68, 69, one of which is shown in a detail perspective view in FIG. 4. The support rollers 66, 67, 68, 69 may be mounted by way of tabs 72 welded to the turntable base 64 to support the roller axles 73. The support rollers 66, 67, 68, 69 extend slightly above the top surface 74 of the turntable base 64. The transverse frame members 53, 54, 55 have end portions which are configured as hooks 76 pointing upwardly. The hooks 76 constitute coupling members.

A first drive means 77 for rotating the upper center section 32 is shown in FIG. 2 and comprises a drive crank 78 connected to a first power unit configured as a powered cylinder 80 for rotation of a shaft 82. The shaft 82 extends rotatably through the intersection 83 of the intermediate longitudinal member 48 and the transverse frame member 52. Shaft 82 extends upwardly past the turntable base 64 to connect to the upper center section 32. The powered cylinder 80 is suitably anchored to the lower center section 30 at the frame member 54. Other drive means and power units for rotating the upper center section and wing section would include power-take-offs, electric or hydraulic motors with gear or screw or belt drives, chain and sprocket mechanisms or winching mechanisms. Moreover, in that the two wing sections provide a balanced load on the turntable base, rotation of the upper center section could also be accomplished by manual drive means such as a hand crank or by an individual manually pushing or pulling on one of the wing sections 40, 41 to rotate the upper section with attached wing assemblies.

The upper center section 32 of the central frame structure 22 overlays the lower center section 30. As shown in FIG. 3, the upper center section 32 has a turntable 84 which engages the support rollers 66, 67, 68, 69. Suitably attached to the turntable 84, such as by way of welding, are transverse frame members 86, 88 and longitudinal members 90, 92. Short frame members 94, 96 join the transverse frame members 86, 88. An additional transverse frame member 98 extends beyond the periphery 100 of the turntable 84 and connects the longitudinal members 90, 92, support braces 102, 104 also connect to the longitudinal frame members 90, 92 and the transverse frame member 86. The shaft 82 of the drive means extends upwardly into the center portion 106 of the turntable 84. The center portion connects to the outer portion 108 of the turntable 84 by way of spokes 110, 111, 112, 113. The shaft 82 is suitably fixed to the turntable 84 so that the turntable 84 and upper center section rotate with the shaft 82. The upper center section 32 thus rotates about a vertical axis, designated A1, extending through the shaft 82.

The transverse frame members 50, 52, 53, 54, 55 of the lower center section comprise forward attachment bars 114 and a rearward attachment bar 115 for attachment of desired tooling, not shown.

Figure 5:
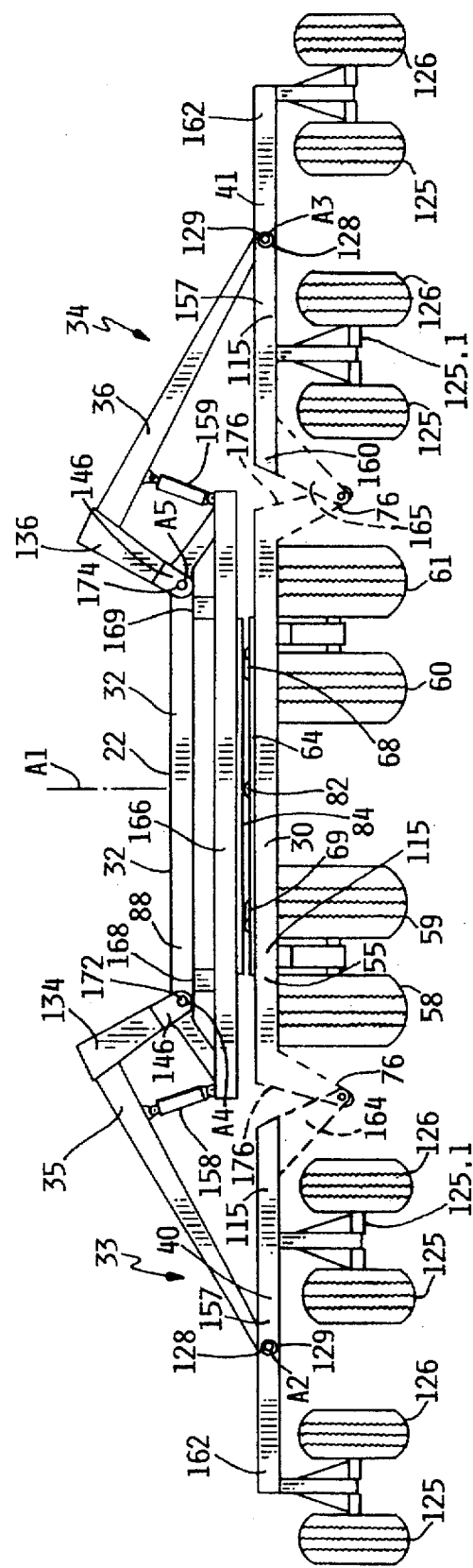
FIG. 5 is a rear elevational view of the implement with the wing sections in the lowered use position.

FIG. 5 is a rear elevational view showing the arrangement of the wing sections 40, 41 and the lifting arms 35, 36 with respect to the central frame structure 22. The upper center section 32 rides on and is rotatable about the lower center section 30.

Figure 6:
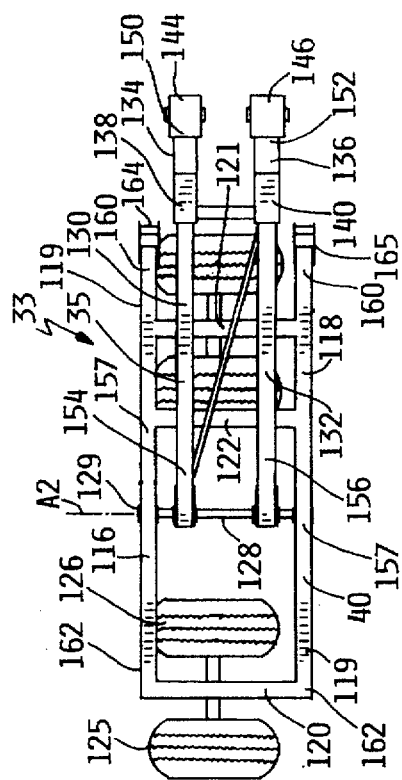
FIG. 6 is a top plan view of a wing assembly with a lifting arm and a wing section.

Referring to FIG. 6, a top plan detail view of one of the wing assemblies, designated the first wing assembly 33 is shown. The first wing assembly 33 is comprised of the first wing section 40 and the attached first lifting arm 35. The wing section 40 has two transverse frame members 116, 118 which constitute forward and rearward attachment bars 114, 115 for attachment of desired tooling, not shown. The wing section 40 also has cross-support members 120, 122. Ground wheels 125, 126 are suitably attached to the wing sections 40, 40.1. One, two or several sets of wheels 125, 126 may be attached along the length of each wing section 40, 40.1. A shaft 128 extends between the transverse frame members 116, 118 to form a hinge or connection point 129 for the lifting linkage 35. The first lifting linkage or arm 35 pivots on the shaft 128.

The first lifting linkage or arm 35 is comprised of parallel elongate portions 130, 132 and two generally upright portions 134, 136. Elbow portions 138, 140 join the elongate portions 130, 132 to the generally upright portions 134, 136 to form a rigid connection. Additional couplings 144, 146 are utilized to hingedly connect the upright portions 134, 136 to the transverse frame members 86, 88 of the upper center section 32. The arm or lifting linkage 35 has a pair of proximal portions 150, 152 and a pair of distal portions 154, 156. The attachment of the lifting linkage 35 to the shaft 128 and consequently the wing section 40 is at the distal portions 154, 156 of the lifting linkage and the mid-section 157 of the wing section 40. The wing section 40 has a pair of proximal end portions 160 and distal end portions 162. The proximal end portions 160 are attached to cooperating coupling members 164, 165 that couple with the coupling members 76 configured as hooks on the transverse frame members 53, 54, 55. The second wing assembly 34 has corresponding structural members as the first wing assembly with a second wing section 41 and second lifting arm or linkage 36 as best shown in FIG. 5.

Continuing to refer to FIG. 5, the wing sections 40, 41 are shown in the lowered position and the apparatus is thus in the use position. The cooperating coupling members 164, 165 are engaged with the hooks 76 which extend from the transverse frame members 53, 54, 55. When the wing sections 40, 41 are configured with inner wheel assemblies 125.1 the coupling members 164, 165 are not necessary and are shown in phantom lines in FIG. 5.

Stabilizing linkages for the wing section may be appropriate, depending on the sizing and specific configuration of an embodiment. Such stabilizing linkages are discussed below with reference to FIGS. 14–18.

As best shown in FIG. 5 a second drive means 158, 159 for raising and lowering the wing sections 40, 41 is comprised of a pair of power units configured as powered cylinders inserted between and suitably connected to the upper center section 32 and the lifting linkages 35, 36. As shown in FIG. 5, the powered cylinders are in a contracted position to transfer the weight from center section 30 to wing assemblies 33, 34 and may be powered downwardly to provide a downward force in each wing assembly. Hydraulic cylinders are ideal because they can provide a fixed downward force as opposed to a fixed positioning of the lifting linkages 35, 36. This allows the wing sections to float with the terrain while maintaining a consistent unweighting of the center section. The turntable base 64 is shown with support rollers 68, 69 extending upwardly from the turntable base and contacting the turntable 84. The shaft 82 which is nonrotatably fixed to the turntable 84 is also shown. This view shows a lower transverse frame member 166 positioned under the upper transverse frame members 86, 88. Struts 168, 169 are shown to provide additional support for the upper transverse frame member 86, 88. The lifting arms 35, 36 are hinged to the transverse frame member 88 by way of pins 172, 174. The lifting linkages or arms 35, 36 thus rotate about horizontal axis of rotation designated A4 and A5.

Referring to FIGS. 5–7 and 9 the implement 20 is illustrated with sets of ground wheels 125, 126 on each wing assembly 33, 34. The number of ground wheels 125, 126 may be increased or decreased based on loading considerations on wing assemblies 33, 34 or the type of terrain to be traversed.

Figure 7:
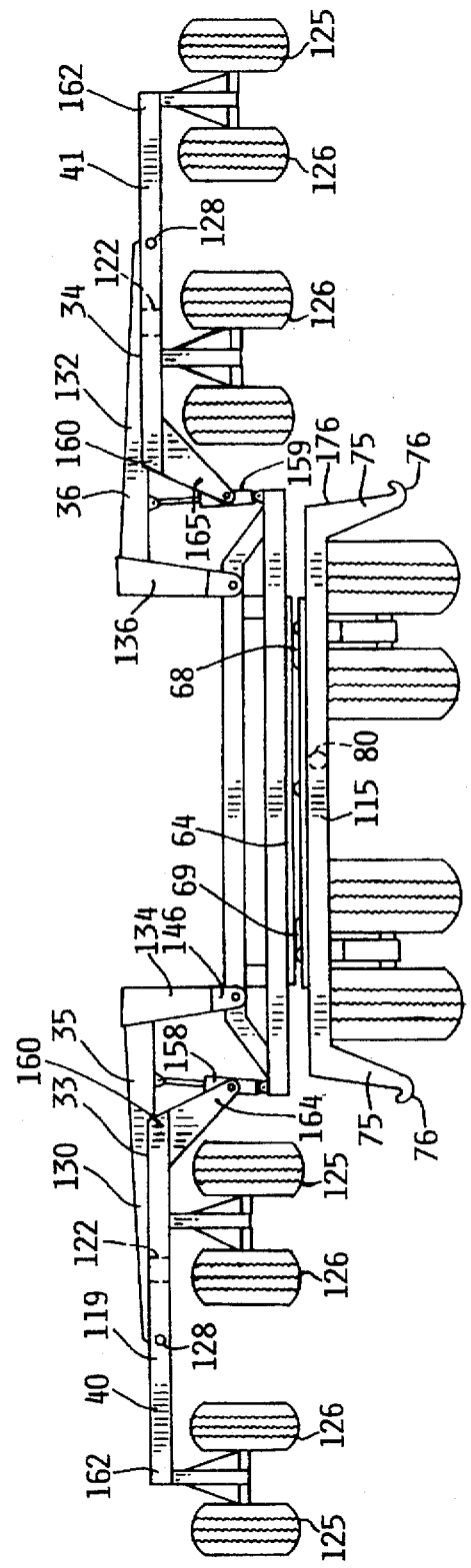
FIG. 7. shows the same view as FIG. 5 with the wing sections in a raised position.

Referring to FIG. 7, the same elevational view as FIG. 6 is shown with the wing sections 40, 41 in an elevated or raised position. The powered cylinders 158, 159 are shown in an extended position. The cooperating coupling members 164, 165 on the end portions 160, 162 of the wing sections 40, 41 are shown dislocated from the hooks 76. The wing sections 40, 41 maintain a substantially horizontal position as shown by way of the engagement of the elongate portions 130, 132 with the cross-members 122, shown in dashed lines, of the wing sections 40, 41.

Figure 8:
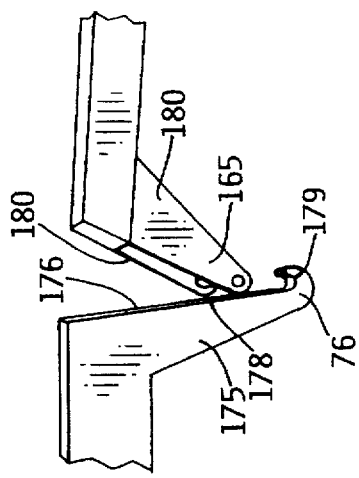
FIG. 8 is a detail elevational view of the hook and cooperating coupling member in a disengaged position.

FIG. 8 shows the detail of a cooperating coupling member 165 disengaging or engaging one of the coupling members 76 configured as a hook. The hooks 76 have a shank 175 which provides an engagement surface 176 that guides the cooperating coupling member 165 during raising or lowering of the wing sections 40, 41. The cooperating coupling members 165 have a pin 178 which seats in the recesses 179 in the hooks 76. The pin 178 is supported by the end portions 160, 162 configured as triangular panels 180. The coupling members 76, 164, 165 provide stabilization of the wing sections 40, 41 while allowing the wing sections 40, 41 to follow ground contours.

Figure 9:
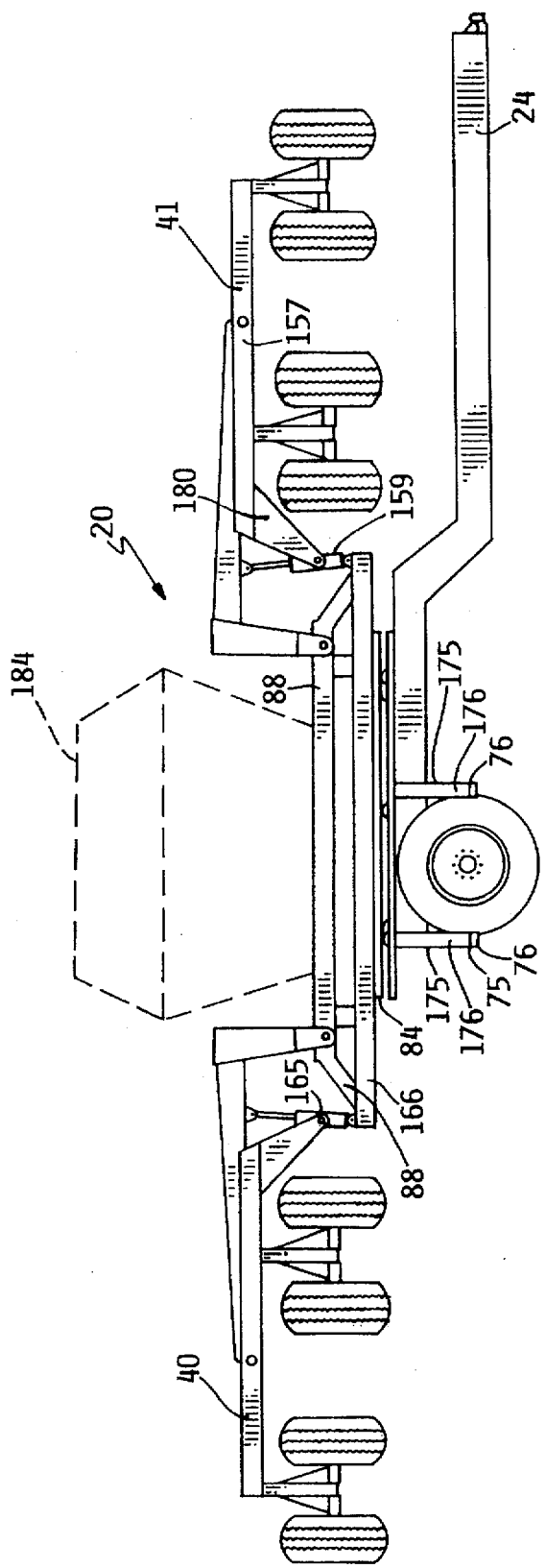
FIG. 9 is side elevational view of the implement in the transport position.

Referring to FIG. 9, the implement 20 is shown in the transport position with the wing sections 40, 41 in the raised position and with the turntable 84 and upper center section 32 rotated one quarter turn from the use position such that the second wing section 41 is positioned in front of the lower center section 30 and above the tongue member 24. The first wing section 40 is positioned rearwardly of the lower center section 30 and the frame structure 22. The wing sections 40, 41 and the central frame structure 22 are thus in substantial alignment with the direction of travel of the implement 20.

FIG. 9 also shows a container 184 in phantom lines positioned on or within the frame members 86, 88, 90, 92, 98. Such a container 184 could be a hopper or a tank and may be utilized with appropriate tooling mounted on the attachment bars. Such tooling, not shown, could comprise grain drills for seeding, or sprayers for the application of fertilizer, herbicides, or insecticides.

The device operates as follows: Referring first to FIGS. 1 and 5, the implement 20 is shown in the use position with the wing sections 40, 41 lowered and adjacent to the sides of the lower center section 30. The coupling members 164, 165 are engaged with the coupling members configured as hooks 76 and the ground-engagement wheels 125, 126 are on the ground. Power units 158, 159 are contracted to move the linkages 35, 36 into a weight bearing position and transfer a portion of the weight of center section 30 to wing assemblies 33, 34. It should be understood, the weight supported by ground wheels 58, 59, 60, 61 is transferred by the power units 158, 159 cooperating with coupling members 76 and 163 and 165 to ground wheels 125, 126. The power units 158, 159 bear against the central frame 32 to lift the weight of wheels 58, 59, 60, 61 and bear against lifting arms 35, 36 to urge the wing assemblies 33, 34 downwardly thus transferring a portion of the weight of the implement 20 to the wings. Thus, any tooling attached to the attachment bars 114, 115 is in proximity to the ground and the implement is largely supported by ground wheels 125, 126 on wing assemblies 33, 34. To convert to the transport position the wing sections 40, 41 are raised by way of the extension of the powered units 158, 159. Said extension raises lifting arms 35, 36 to raise the wing sections 40, 41. With the implement configured as shown, the end portions 160, 162 will first raise releasing the cooperating coupling members 164, 165 from the hook 76. The wing section wheels 125, 126 will remain momentarily on the ground due to their greater weight as compared to the end portions 160, 162 with respect to the shaft 128 which functions as a pivot point.

Referring next to FIG. 7, the continued extension of the powered cylinders 158, 159 continues to raise the wing sections 40, 41 and the coupling members 164, 165 ride up the engagement surface 176. The cross members 122 of the wing sections 40, 41 contact the elongate portions 130, 132 of the lifting arms 35, 36 which prevents further tilting of the wing section 40, 41. As the powered cylinders continue to extend, the lifting arms 35, 36 continue to lift upwardly to raise the wing sections 40, 41 to a substantially horizontal position as shown in FIG. 7.

The drive means 77 for rotating the upper center section is then activated by expanding the powered cylinder 80 to push the crank 78 which rotates the shaft 82, best shown in FIGS. 1 and 2. This shaft 82 is fixed to the center portion 106 of the turntable 84 thus causing the turntable 84 to rotate with the shaft 82. The turntable 84 rides on the support rollers 66, 67, 68, 69 to facilitate the rotation of the upper center section 32 and wing assemblies 33, 34 and to minimize the loading on the shaft 82. The powered cylinder 80 is extended until the upper center section 32, along with the attached lifting arms 35, 36 and wing sections 40, 41 have moved into the transport position as shown in FIG. 9. In the transport position, the wing sections 40, 41 and the central frame structure 22 is in substantial alignment with the direction of travel of the implement.

Significantly, when the apparatus 20 is in the use position, all of the wheels 58, 59, 60, 61, 125, 126 are substantially aligned axially providing easy maneuverability in towing. This is of particular advantage in making turns in the field.

Moreover, additional wheels could be provided intermediate the distal end portion 162 and in the proximal end portion 160 of wing sections 40, 41 to provide improved contour following capabilities and weight carrying capabilities of the apparatus.

The powered cylinders 158, 159 for the drive means are suitably hydraulic cylinders which are connected to a conventional control unit and hydraulic pressure source by hydraulic lines, not shown. The control unit for the powered cylinders or other power units may be located in a convenient position such as on the tractor in proximity to the operator position.

Although the lifting linkages 35, 36 are shown as a rigid lifting arm, articulated linkages with pivoting joints such as four-bar linkages are also contemplated and are intended to be included within the definition of lifting linkages.

The coupling members 76 shaped as hooks could also have the open hook closed to form an aperture and the pin 178 of the cooperating coupling members 164, 165 could be removable to permit the joint to be releasably locked by way of insertion and removal of the pin 178.

The apparatus may be constructed by conventional means using suitably sized steel plate stock and square tubing welded or otherwise conventionally joined and fastened.

Alternate drive means for raising and lowering the wing sections 40, 41 in addition to the powered cylinders are conventional such screw drives, gear drives, or chain or cable systems with a winch. Such systems could be powered by an electric motor, hydraulic motor, a pneumatic motor, internal combustion engine, power take-off, or by a hand crank.

Referring to FIGS. 10, 11, 12 and 13, an embodiment of the invention is shown comprising an extensible frame portion 180 which telescopes into the longitudinal members 46, 47. The extensible frame portion operates to vary the length of the implement. That is, the distance between the tow vehicle and the lower center section 30. For example, to accommodate the wing section forwardly when the apparatus is in the transport mode. The extensible frame portion 180 has a retracted position as shown in FIGS. 10 and 11 and an expanded position shown in FIG. 12. FIG. 13 is a detailed sectional view taken at line 1313 of FIG. 12 and shows the longitudinal member 46 with the extensible member 180 telescoping therein. A powered hydraulic cylinder 186, which constitutes a third drive means, operates to extend and retract said extensible frame portion 180. The extensible frame portion is connected to a tow vehicle hitching portion 190 by way of a cross-frame member 192 and converging members 193, 194. Alternate drive means for the powered cylinder are anticipated such as screw drives, gear drives, or chain or cable systems. Such systems may be powered by electric, hydraulic, pneumatic internal combustion motors, power take-offs or manually.

Referring to FIGS. 14, 15, 16, 17 and 18, alternate configurations of a stabilizing linkage is shown. This embodiment utilizes ground-engaging wheels 125, 126, positioned at the distal portion 162 of the wing section 40, and additional ground-engaging wheels 196, 197, positioned at the proximal end portion 160 of said wing section 40. This particular configuration allows the wing section to follow a wide variety of contours. Additionally, there is more ground-engagement points provided by the proximal wheels 196, 197 and the distal wheels 125, 126 for better unweighting capabilities of the central frame portion 22 if desired.

The wing section in this configuration is best shown in FIGS. 16 and 18 and pivots at a horizontal axis A2 at the hinge or connection point 129. Thus, the distal wheels 125, 126 can independently follow contours separately from the proximal wheels 196, 197.

Referring to FIGS. 14 and 15, the stabilizing linkage 200 is shown in detail in a retracted position and an extended position. This configuration of the stabilizing linkage 200 utilizes telescoping members 202, 204 which track inside of exterior telescoping members 206, 208. The telescoping members all are pivotally attached to either the wing section 40 or the upper frame section 32 at hinges 212. Cross-members 216, 218 are provided for additional stability.

FIG. 17 and FIG. 18 show an alternative embodiment utilizing pivotally connected foldable members 222, 224, 226, 228. The foldable members are pivotally connected together at hinges 230 and 232 and to the wing section and upper center section 32 at pivot points or hinges 212.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A farm implement for towing behind a tow vehicle, the implement having a use position and a transport position, the implement comprising:
   a) a central frame structure comprising a lower center section and an upper center section and a tow vehicle hitching portion, the lower center section having two sides, a front, a rear, and wheels for contacting the ground, the upper center section positioned above and rotatably attached to the lower center section, the upper center section having two sides, the tow vehicle hitching portion extending forwardly and connectable to the tow vehicle;
   b) a pair of lifting linkages, each lifting linkage comprising distal and proximal end portions, the lifting linkages hinged to the upper center section at the proximal end portion with the distal end portions extending laterally outward from the upper center section whereby the distal end portions are moveable upwardly and downwardly;
   c) a pair of wing sections, each wing section connected to the distal end portion of one of the lifting linkages, each wing section comprising a ground engaging wheel.
   d) a pair of first powered cylinders, one connected to each lifting linkage, the powered cylinders positioned to apply an upward force to the distal end portions of the lifting linkages thereby raising the wing sections to a substantially horizontal raised position relative to the central frame structure, and a downward force to the distal end portions of the lifting linkages thereby lowering the wing sections to a substantially horizontal lower position relative to the central frame structure and transferring weight of the central frame structure to the wing sections.

2. The apparatus of claim 1 further comprising a second drive means for rotating the upper center section and the wing sections between the use position where the wing sections are laterally positioned with respect to the lower center section and the transport position where one of the wing sections is positioned forwardly of the lower center section and one of the wing sections is positioned rearwardly of the lower center section.

3. The apparatus of claim 1, wherein each side of the lower center section has a coupling member, and wherein each wing section has a cooperating coupling member sized and positioned to releasably engage the coupling member when each wing section is in the lowered position and laterally positioned with respect to the lower section.

4. The apparatus of claim 1, wherein the central frame structure further comprises an extensible frame portion connected to the tow vehicle hitching portion.

5. The apparatus of claim 4 further comprising a third drive means and wherein the extensible frame portion is comprised of at least two telescoping sections.

6. The apparatus of claim 1, wherein each of the powered cylinders providing a steady downward force to the lifting linkages whereby the wing sections may follow ground contours.

7. The apparatus of claim 4, wherein each lifting linkage consists of a rigid arm extending above the wing section for lifting and lowering the attached wing section.

8. The apparatus of claim 7, wherein each wing section has a mid-section and said wing section is pivotally connected to the respective lifting linkage at said mid-section, and wherein each wing section has a distal end and a proximal end and wherein each wing section has a ground engagement wheel at the distal end and a ground engagement wheel at the proximal end whereby the distal end and the proximal end each may independently follow ground contours.

9. The apparatus of claim 7 further comprising a stabilizing linkage between each wing section and the central frame structure.

10. The apparatus of claim 9, wherein each stabilizing linkage is comprised of telescoping members.

11. The apparatus of claim 9, wherein each stabilizing linkage is comprised of a pair of pivotally connected foldable members.

12. A farm implement to be towed behind a tractor during field use and during transport, the implement convertible between a laterally expanded use position and a laterally narrow transport position, the implement comprising:
   a) a central frame structure comprising a lower center section and a rotatable section, the lower center section comprising a front, a rear, two sides, an extensible frame at the front, and ground engagement wheels, the rotatable section rotatably mounted on the lower center section and having opposite sides and a substantially vertical axis of rotation;
   b) a pair of pivotal connectors, each having distal and proximal end portions, the proximal end portions of the pivotal connectors pivotally hinged to opposite sides of the rotatable section;
   c) two wing sections for attachment of agricultural tooling, each wing section pivotally connected to the distal end portion of one of the pivotal connectors whereby the wing sections move upwardly and downwardly relative to the central frame structure and rotate with the rotatable section between a use position wherein the wing sections are in a position adjacent to the sides of the lower center section and a transport position wherein one wing section is positioned in front of the lower center section and one wing section is positioned rearwardly of the lower center section; and
   d) a tongue member extending forwardly from the extensible frame for hitching to the tractor whereby the distance between the tractor and the lower center section may be varied.

13. The implement of claim 12, wherein the pivotal connectors are further defined by a pair of lifting linkages, each lifting linkage having a proximal end portion and a distal end portion, the proximal end portions of the lifting linkages pivotally connected to the rotatable section with a substantially horizontal axis of rotation and with the two distal portions extending laterally in opposite directions outward with respect to the rotatable section and connecting to each respective wing section.

14. The farm implement of claim 13, wherein each wing section has a midsection, a proximal end portion, and a distal end portion and the lifting linkages are pivotally connected to each wing section at the midsections.

15. The farm implement of claim 14, wherein each wing section is comprised of a ground engaging wheel, the wheel secured to each wing section at the distal end portions, the farm implement further comprising a pair of first powered cylinders, one connected to each lifting linkage, the powered cylinders positioned to apply an upward force to the distal portions of the lifting linkage thereby raising the wing sections to a substantially horizontal raised position relative to the central frame structure, and a downward force to the distal portions of the lifting linkages thereby lowering the wing sections to a substantially horizontal lower position relative to the central frame structure and transferring weight of the central frame structure to the wing sections.

16. The farm implement of claim 12, wherein each wing section is comprised of at least one ground engaging wheel, the farm implement further comprising a pair of first powered cylinders, one connected to each wing section, the powered cylinders positioned to apply an upward force to the wing sections thereby raising the wing sections to a substantially horizontal raised position relative to the central frame structure, and a downward force to the wing sections thereby lowering the wing sections to a substantially horizontal lower position relative to the central frame structure and transferring weight of the central frame structure to the wing sections.

17. The farm implement of claim 15, wherein the lower center section further comprises two coupling members, one positioned at each side of the lower section, and wherein the wing sections are each further comprised of cooperating coupling members on each proximal end portion for engaging with the coupling members when the implement is in the use position.

18. The farm implement of claim 15, wherein each wing section further comprises an additional ground engaging wheel at the proximal end portion.

19. The farm implement of claim 18 further comprising a pair of stabilizing linkages, each of the stabilizing linkages located between the central frame structure and one of the wing sections.

20. A towable farm implement comprising:
a) a central frame structure with attached ground wheels, the central frame structure having a front, a rear, and opposing first and second sides;
b) a first wing section having attached ground wheels, the first wing section positioned at the first side of the central frame structure; and
c) a first arm pivotally connected to and extending laterally from the central frame structure and pivotally attached to the first wing section, the lifting arm powered for providing a downward force on the first wing section to downwardly move the first wing section relative to the central frame structure thereby transferring weight of the central frame structure to the first wing section.

21. The farm implement of claim 20 further comprising:
a) a second wing section with attached ground wheels, the second wing section positioned at the second side of the central frame structure;
b) a second arm pivotally connected to and extending laterally from the central frame structure and pivotally attached to the second wing section, the lifting arm powered for providing a downward force on the second wing section to downwardly move the second wing section relative the central frame structure thereby transferring weight of the central frame structure to the second wing section.

22. The implement of claim 21, wherein the central frame structure further comprises a rotatable section and wherein the first arm and the second arm are powered for raising the wing sections whereby the wing section may be raised off the ground and rotated to the front and rear of the central frame structure.

* * * * *